E. E. WICKERSHAM.
CONSTRUCTION FOR TRACTION ENGINES.
APPLICATION FILED OCT. 24, 1918.
1,429,472.
Patented Sept. 19, 1922.
2 SHEETS—SHEET 1.
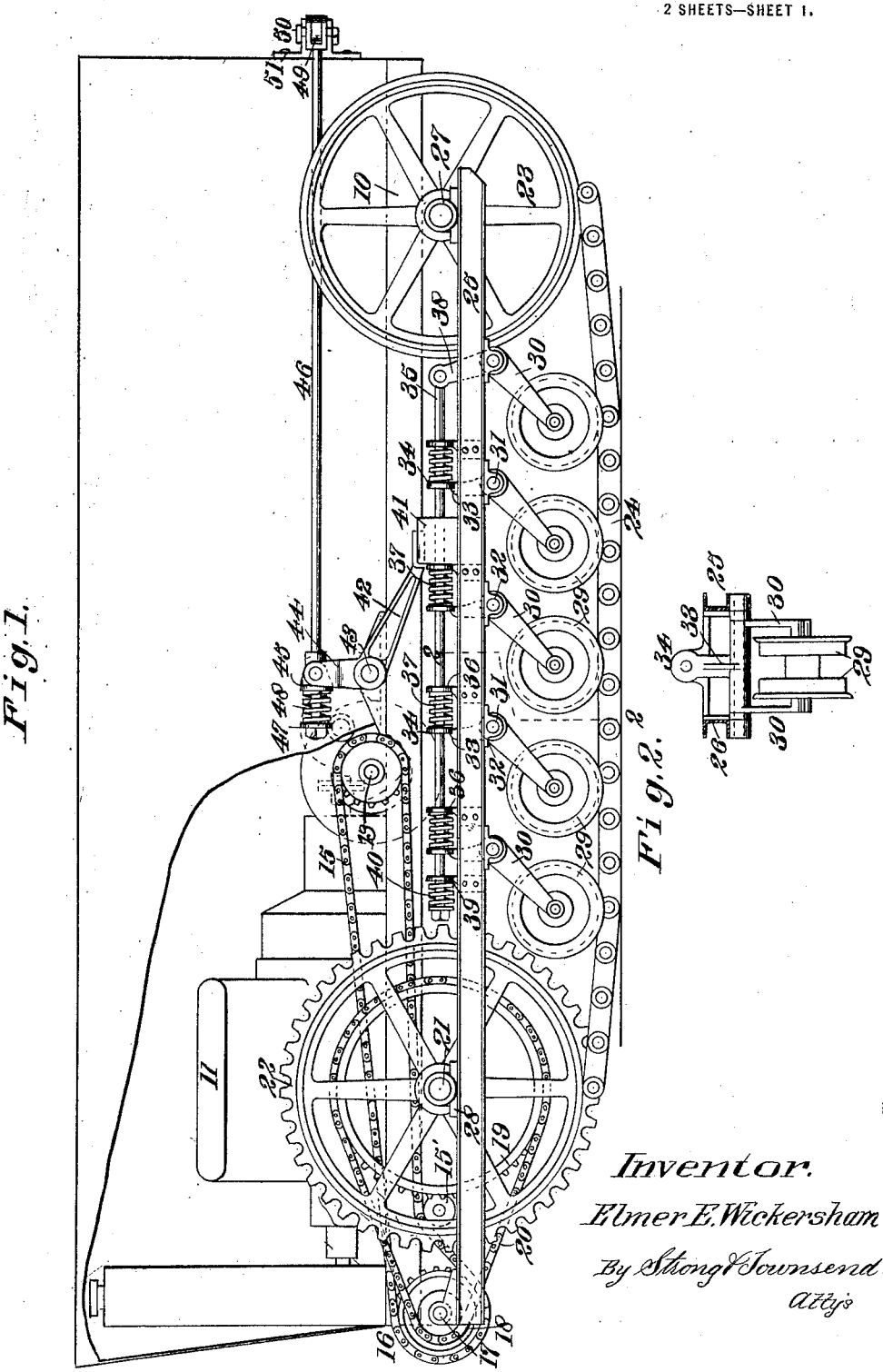
Inventor.
Elmer E. Wickersham
By Strong & Townsend
Att'ys

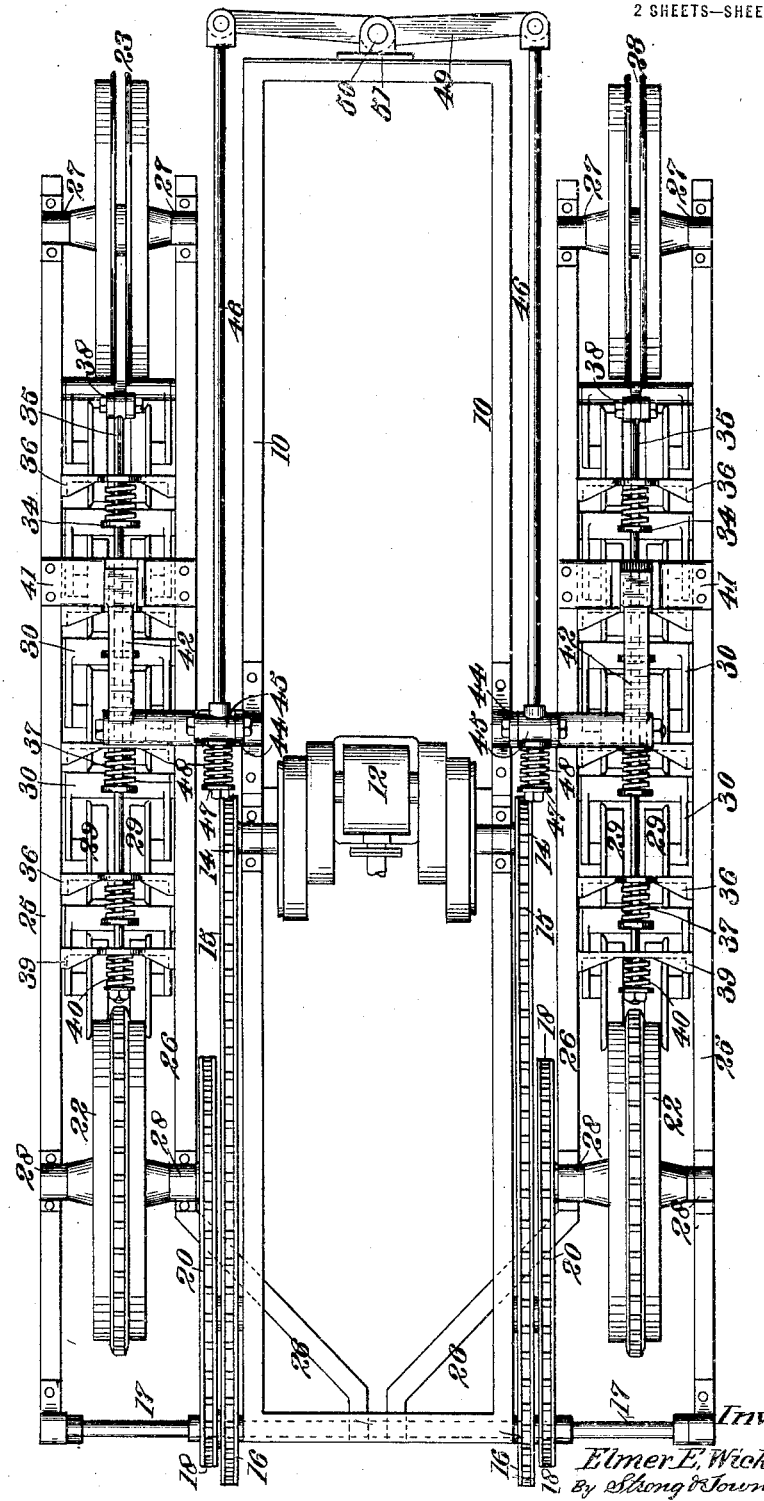

Patented Sept. 19, 1922.

1,429,472

UNITED STATES PATENT OFFICE.

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

CONSTRUCTION FOR TRACTION ENGINES.

Application filed October 24, 1918. Serial No. 259,583.

*To all whom it may concern:*

Be it known that I, ELMER E. WICKERSHAM, a citizen of the United States, residing at Stockton, in the county of San Joaquin and State of California, have invented new and useful Improvement in Construction for Traction Engines, of which the following is a specification.

This invention relates to a tractor construction and particularly pertains to a tractor of the self-laying chain track type.

Due to the fact that tractors are necessarily of heavy construction and are rigid in their structure, it has been a matter of considerable consideration to provide a tractor of the self-laying chain track type with a suitable frame suspension by which the body of the tractor may be supported in a flexible manner and at the same time allow the lower run of chain to easily conform to the contour of the roadway.

It is the principal object of the present invention to provide a running gear mechanism for chain type tractors adaptable to flexibly support the main frame and to yieldably rest upon the chain tread.

The present invention contemplates the use of roller trucks pivotally connected to the main frame of a tractor at their rear ends and at a point in the rear of the axes of the chain track driving sprockets and supporting the forward end of the tractor by a yieldable equalizing mechanism, the opposite ends of said trucks carrying the driving sprockets and idler wheels for chain tracks while the intermediate portions of the trucks carry a series of separate yieldable load supporting rollers adapted to bear upon the lower run of track and to primarily support the vehicle. This invention is illustrated by way of example in the accompanying drawings in which—

Fig. 1 is a view in side elevation illustrating the complete and assembled tracks and particularly disclosing the construction of the chain track truck, the frame suspension and the tractor driving mechanism, parts of the chain tread being broken away for clearness.

Fig. 2 is a view in transverse section as seen on line 2—2 of Fig. 1, illustrating the truck construction and the manner in which the separate track rollers are supported.

Fig. 3 is a view in plan illustrating the tractor main frame as supported upon self-laying track units at the opposite sides thereof, said units being shown without their chain tracks and further disclosing a fragmentary portion of the power transmission mechanism.

Referring more particularly to the drawings, 10 indicates a tractor main frame here shown as formed of rigidly united side rails and end bars. Positioned upon this frame is a power plant 11 adapted to drive a transmission mechanism 12. The opposite ends of this mechanism are provided with driving shafts 13 which extend outwardly through bearings upon the main frame and are there fitted with driving sprockets 14. Sprocket chains 15 lead around these sprockets and two larger driving sprockets 16 upon a jack shaft 17. This last named shaft is non-rotatably held within bearings secured directly beneath and to the rear end of the main frame. Mounted upon the jack shaft and upon the outside of the sprocket 16 are sprockets 18 which cooperate with enlarged driving sprockets 19 to receive final drive chains 20. The sprockets 16 and 18 are mounted upon flanged journals to which they are bolted. These journals are held in position upon the shaft 17 by means of collars at their outer ends and are free to rotate around the shaft. The large sprockets are fixed around the axles 21 of the chain track sprockets 22. It will be understood that these sprockets and idler sprockets 23 receive link chain tracks 24 upon which the vehicle is propelled.

Pivotally secured to the jack shaft 17 are track trucks. These trucks consist of outer rails 25 extending parallel to the main frame and having bearings at their rear end which are rotatably mounted on the outer ends of the jack shaft and inner rails 26 which stand parallel with the rails 25 for a major portion of their length and thereafter are bent inwardly to engage the jack shaft at a point near the center of the main frame and therebeneath. The forward ends of the rails 25 and 26 are fitted with bearings 27 for receiving the axle of the idlers 23. The opposite ends are fitted with bearings 28 for receiving the axle of the chain track driving sprockets 22.

Positioned at intervals along the under-side of each of the rails and between the idler wheels 23 and sprockets 22 are load supporting rollers 29. These rollers are arranged in pairs as shown in Fig. 2 and are adapted to bear upon the upper face of the lower run of track chain. The rollers are mounted on the ends of cantilever arms 30. These arms are inclined at an angle to the vertical and are pivoted upon pins 31 carried by the bearings 32. Each of these levers is formed with an upwardly extending finger 33 which is enlarged to provide a pad 34 at its upper end. This pad is perforated to receive a cushion rod 35, one of which rods extends midway between the rails 25 and 26 of each truck and is of a length to terminate between the sprockets 22 and idlers 23. Secured across the rails are brackets 36 which also carry pads through which the rods 35 extend. Interposed between the pads of the fingers and complementary pads of the brackets are helical compression springs 37. Thus, as power is exerted to swing the rollers 29 upwardly, this motion will be resisted by the compression of the springs 37 as they act between the fingers and the cross frame members. The rollers 29 which are nearest the idler wheels 23 are provided with crank arms 38 which are formed to swing in unison with the cantilever arms 30 and to which one end of the rods 35 pivotally connect. The opposite ends of these rods extend through cross-frame members 39 disposed between the sprocket wheels 22 and the nearest roller 30 and are there fitted with springs 40 which act between the cross-member and a washer on the end of the rod. Thus, as the arm 38 is thrown forwardly the spring 40 will be compressed.

The main frame is free to float in relation to the forward ends of the truck frames and is suspended by an equalizing mechanism to reduce the relative movement of the main frame in relation to the separate truck units to a minimum. This mechanism consists of cross-blocks 41 secured to each of the roller frames and providing a support for a pressure arm 42. These arms stand in the same plane at opposite sides of the main frame, and are fixed to rotate around shafts 43 supported at the opposite sides of the main frame. These shafts also carry levers 44 which pivotally engage sleeves 45 at their upper ends. The sleeves are fixed upon side rods 46 which extend along the opposite sides of the main frame and parallel thereto. The ends of these rods are provided with washers 47 and between these washers and the sleeves compression springs 48 are positioned. The rods extend forwardly and engage an equalizer bar 49 at their forward terminating ends. This bar is centrally pivoted upon a pin 50 to a bracket 51 which is mounted at the center of the front cross rail of the main frame. In the present instance, the bar 49 has been secured across the front of the main frame. It will be evident, however, that the bar could be secured across the main frame at a point directly in front of the arms 44, if desired, or it might be disposed at any point in the rear of these arms without impairing its operation. Thus, as the rods 46 are pivoted to the opposite ends of the bar, it will be seen that the two rods will be interconnected and that movement of one in a single direction will produce contrary movement of the other.

In operation the vehicle is propelled by power delivered to the transmission 12 and thereafter imparted to the sprocket chains 15. These chains, while passing around the sprocket 16, will cause rotation of the jack shaft 17 and will thereafter act through the final drive chains 20 to rotate the axles 21 of the chain tread sprockets 22. In order to provide proper clearance, idler wheels 15' are disposed beneath the lower run of each of the chains 15. As the vehicle passes along the highway, inequality in the contour of the roadbed will be locally accommodated by the flexing of the arms 30 and the resultant upward movement of the individual rollers 29, thus reducing the vibration of the main frame as normally affected by small irregularities in the roadbed. When the roadbed upon opposite sides of the vehicle is out of level, one of the truck frames will swing upwardly as pivotally supported from the jack shaft 17. This action will swing the corresponding pressure arms 42 upwardly and will cause it to force against the complementary spring 48. Upon compressing this spring, the rod 46 will be drawn and this in turn will move the opposite rod in an opposite direction, thus acting to force the other pressure arm downwardly. As the two roller frames and the chain tracks are rigidly supported upon the ground, the effect will be to raise the main frame half the distance of the difference in level between the roller frames, thereby equalizing the movement of the roller frames and reducing the vibration of the main frame to a minimum.

Reference being had particularly to Fig. 1, it will be noted that the roller truck frames are supported to swing from a point in the rear of the axis of the driving sprockets 22 and that this swinging action will be resisted by the equalizer mechanism interposed between the forward free ends of the truck frames and the main frame. By this arrangement, the driving chain 20 leading from the sprocket 18 to the driving sprocket 19 will always be in the same condition of tension irrespective of the swinging movement of the separate truck rollers in relation to the main frame.

It will thus be seen that the frame suspension here shown, while simple in its construction, allows the chain track to conform to the contour of the ground over which it passes, at the same time permitting an equalization of the movements of the two truck units without interruption of power in the chains.

Having thus described my invention, what I claim and desire to secure by Letters Patent is—

1. In a tractor construction, a main frame, track units at the opposite sides of said main frame and including driving sprockets, idler wheels, truck frames and track chains embracing the sprockets and wheels, means for pivotally connecting said truck units to the main frame at points in the rear of the driving sprockets, and yielding connections between the truck frames and the main frame permitting rocking movement of the truck frames about their rear pivotal connection with the main frame under operative conditions.

2. In a tractor construction, a main frame, track units at the opposite sides of said main frame and including driving sprockets, idler wheels, truck frames and track chains embracing the sprockets and wheels, means for pivotally connecting said truck units to the main frame at points in the rear of the driving sprockets, means for driving the sprockets of the track units from the axis of said point of connection, and yielding connections between the truck frames and the main frame permitting rocking movement of the truck frames about their rear pivotal connection with the main frame under operative conditions.

3. In a tractor construction, a main frame, roller truck frames at the opposite sides thereof, idler wheels fixed at the forward ends of said truck frame, sprocket wheels fixed to the truck frames adjacent their rear ends, track chains embracing the sprocket and idler wheels, means for pivotally connecting the truck frames to the main frames at a point in the rear of the sprocket wheels, and means for yieldably supporting the main frame from the forward ends of the truck frames.

4. In a tractor construction, a main frame, roller truck frames at the opposite sides thereof, idler wheels fixed at the forward ends of said truck frames, sprocket wheels fixed to the truck frames adjacent their rear ends, track chains embracing the sprocket and idler wheels, means for pivotally connecting the truck frames to the main frames at a point in the rear of the sprocket wheels, and means for yieldably supporting the main frame from the forward ends of the truck frames, driven means rotating around the pivotal axis of the truck frames and driving connections between said means and the sprocket wheels.

In testimony whereof I have hereunto set my hand in the presence of two subscribing witnesses.

ELMER E. WICKERSHAM.

Witnesses:
W. W. HEALEY,
JAMES M. ABBETT.